United States Patent
Cui et al.

(10) Patent No.: US 12,513,597 B2
(45) Date of Patent: Dec. 30, 2025

(54) ACCESS CONTROL METHOD AND APPARATUS, AND DEVICE AND STORAGE MEDIUM

(71) Applicant: ZTE CORPORATION, Shenzhen (CN)

(72) Inventors: Fangyu Cui, Shenzhen (CN); Nan Zhang, Shenzhen (CN); Wei Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 507 days.

(21) Appl. No.: 17/918,043

(22) PCT Filed: Apr. 9, 2021

(86) PCT No.: PCT/CN2021/086054
§ 371 (c)(1),
(2) Date: Oct. 10, 2022

(87) PCT Pub. No.: WO2021/204230
PCT Pub. Date: Oct. 14, 2021

(65) Prior Publication Data
US 2023/0124820 A1    Apr. 20, 2023

(30) Foreign Application Priority Data

Apr. 10, 2020  (CN) .......................... 202010281177.9

(51) Int. Cl.
*H04W 48/06* (2009.01)
*H04W 48/04* (2009.01)

(52) U.S. Cl.
CPC .......... *H04W 48/04* (2013.01); *H04W 48/06* (2013.01)

(58) Field of Classification Search
CPC ............................... H04W 48/04; H04W 48/06
See application file for complete search history.

(56) References Cited

U.S. PATENT DOCUMENTS

| 12,114,197 B2 * | 10/2024 | Hedman | H04W 28/0289 |
| 2008/0076398 A1 * | 3/2008 | Mate | C22C 21/00 |
| | | | 455/414.2 |

(Continued)

FOREIGN PATENT DOCUMENTS

| CN | 101019402 B | * | 9/2012 | ............ H04L 65/40 |
| CN | 103812131 A | * | 5/2014 | ............... H04J 3/78 |

(Continued)

OTHER PUBLICATIONS

PE2E-Search Machine Translation of CN 103812131 A, published on May 21, 2014. (Year: 2014).*

(Continued)

*Primary Examiner* — Rafael Pérez-Gutiérrez
*Assistant Examiner* — Gilbert M. Grant
(74) *Attorney, Agent, or Firm* — Morgan, Lewis & Bockius LLP

(57) ABSTRACT

Provided are an access control method and apparatus, and a device and a storage medium. The access control method includes: receiving an access configuration message transmitted by a second communication node; and determining whether to access a network according to the access configuration message.

20 Claims, 2 Drawing Sheets

(56) References Cited

U.S. PATENT DOCUMENTS

| | | | | |
|---|---|---|---|---|
| 2014/0254364 | A1* | 9/2014 | Xiang | H04W 48/14 |
| | | | | 370/232 |
| 2018/0242224 | A1 | 8/2018 | Pinheiro et al. | |
| 2019/0150061 | A1* | 5/2019 | Ishii | H04W 48/06 |
| | | | | 370/329 |
| 2020/0322877 | A1* | 10/2020 | Li | H04W 48/12 |
| 2022/0329314 | A1* | 10/2022 | Liu | H04W 52/42 |
| 2022/0338183 | A1* | 10/2022 | Zheng | H04L 1/0025 |
| 2023/0014413 | A1* | 1/2023 | Liu | H04W 48/02 |

FOREIGN PATENT DOCUMENTS

| | | | | |
|---|---|---|---|---|
| CN | 104507139 | A | 4/2015 | |
| CN | 107734708 | A | 2/2018 | |
| CN | 110972217 | A | 4/2020 | |
| CN | 112512095 | A | 3/2021 | |
| EP | 2869638 | A1 | 5/2015 | |
| KR | 20100116531 | A * | 4/2010 | H04W 48/08 |
| WO | WO2018/045511 | A1 | 3/2018 | |

OTHER PUBLICATIONS

PE2E-Search Machine Translation of KR 20100116531 A, published on Nov. 1, 2010. (Year: 2010).*
PE2E-Search Machine Translation of CN 101019402_B, published on Sep. 12, 2012 (Year: 2012).*
Extended European Search Report in Application No. 21784700.3, dated Apr. 16, 2024, 10 pages.
International Search Report in Application No. PCT/CN2021/086054, dated Jul. 9, 2021, 4 pages, including English Translation.
Mediatek, Inc., "Summary Delay-tolerant re-transmission mechanisms in NR-NTN", 3GPP TSG RAN WG1 Meeting #96bis, R1-1905733, Apr. 12, 2019, 7 pages.

* cited by examiner

ACCESS CONTROL METHOD AND APPARATUS, AND DEVICE AND STORAGE MEDIUM

CROSS REFERENCE TO RELATED APPLICATIONS

This is a National Stage Application, filed under 35 U.S.C. 371, of International Patent Application No. PCT/CN2021/086054, filed on Apr. 9, 2021, which is based on claims priority to Chinese Patent Application No. 202010281177.9 filed with the China National Intellectual Property Administration (CNIPA) on Apr. 10, 2020, the disclosure of which is incorporated herein by reference in its entirety.

TECHNICAL FIELD

The present application relates to wireless communications networks, for example, an access control method and apparatus, a device, and a storage medium.

BACKGROUND

In a non-terrestrial network (NTN), since a base station is at high altitude and generally has high mobility, communications is often accompanied by large delay and high Doppler shift. When the value of the delay and Doppler shift exceeds the tolerance range of the base station, the communication quality can be degraded or even user access may fail. Therefore, in a spatial three-dimensional network, a base station needs to perform an access restriction on users who do not satisfy specific conditions in different scenarios and time periods to improve network performance. However, the mechanism of a traditional terrestrial communications network cannot satisfy various requirements of different types of base stations in the spatial three-dimensional network.

SUMMARY

The present application provides an access control method and apparatus, a device, and a storage medium.

An embodiment of the present application provides an access control method applied by a first communication node. The access control method includes receiving an access configuration message transmitted by a second communication node and determining whether to access a network according to the access configuration message.

An embodiment of the present application provides an access control method applied by a second communication node. The access control method includes sending an access configuration message to a first communication node. The access configuration message is configured by the first communication node to determine whether to access a network.

An embodiment of the present application provides an access control apparatus configured in a first communication node. The access control apparatus includes a first reception module and a determination module.

The first reception module is configured to receive an access configuration message transmitted by a second communication node. The determination module is configured to determine whether to access the network according to the access configuration message.

An embodiment of the present application provides an access control apparatus configured in a second communication node. The access control apparatus includes a first sending module.

The first sending module is configured to send an access configuration message to a first communication node. The access configuration message is configured by the first communication node to determine whether to access a network.

An embodiment of the present application provides a device. The device includes one or more processors and a memory.

The memory is configured to store one or more programs. When executed by the one or more processors, the one or more programs cause the one or more processors to implement the access control method according to any embodiment of the present application.

An embodiment of the present application provides a storage medium. The storage medium stores a computer program which, when executed by a processor, implements the access control method according to any embodiment of the present application.

DETAILED DESCRIPTION

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, the steps illustrated or described may be performed in sequences different from those described here in some cases.

The technical solutions of the present application may be applied to such communications systems as a Global System for Mobile Communications (GSM), a code-division multiple access (CDMA) system, a wideband code-division multiple access (WCDMA) system, General Packet Radio Services (GPRS), a Long Term Evolution (LTE) system, a Long Term Evolution Advanced (LIE-A) system, a Universal Mobile Telecommunications System (UMTS), and a fifth-generation mobile communications system (5G). These are not limited by the embodiments of the present application. In the present application, a 5G system is used as an example.

Figure 1:
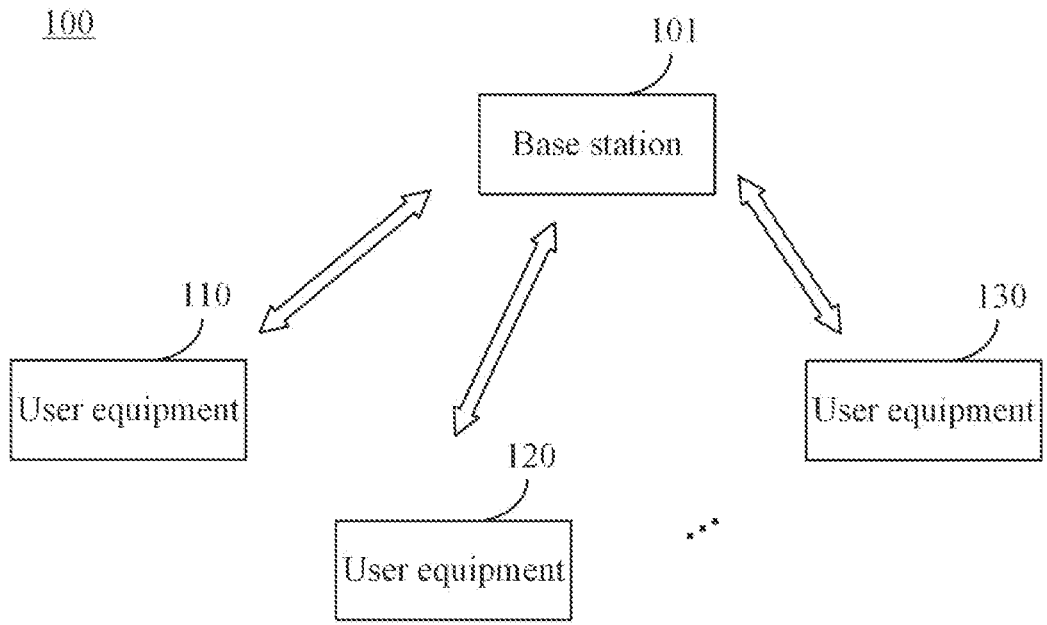
FIG. 1 is a diagram illustrating the structure of a radio network system according to an embodiment of the present application.

The embodiments of the present application may be applied to radio networks of different standards. Radio access networks may include different communication nodes in different systems. FIG. 1 is a diagram illustrating the structure of a radio network system according to an embodiment of the present application. As shown in FIG. 1, a radio network system 100 includes a base station 101, a user equipment 110, a user equipment 120, and a user equipment 130. The base station 101 performs wireless communications with the user equipment 110, the user equipment 120, and the user equipment 130, respectively.

In the embodiments of the present application, the base station may be a device capable of communicating with a user terminal. The base station may be any device having radio transceiving functions, and includes, but is not limited to, a base station (NodeB), an evolved base station (eNodeB), a base station in the 5G communications system, a base station in a future communications system, an access node in a wireless fidelity (WiFi) system, a wireless relay node, and a wireless backhaul node. The base station may also be a radio controller in a cloud radio access network (CRAN) scenario. The base station may also be a small station and a transmit-receive point (TRP). This is not limited by the embodiments of the present application.

In the embodiments of the present application, the user terminal is a device having radio transceiving functions. The device may be deployed on land including indoor or outdoor, handheld, wearable, or vehicle-mounted; may be also deployed on water (such as in ships); and may be also deployed in the air (such as in airplanes, balloons and satellites). The user terminal may be a mobile phone, a tablet computer (e.g. PAD), a computer having wireless transceiving functions, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, and a wireless terminal in a smart home. The application scenarios are not limited in the embodiments of the present application. The user terminal may sometimes be called a terminal, an access terminal, a user equipment (UE) unit, a UE station, a mobile station, a mobile platform, a remote station, a remote terminal, a mobile equipment, a UE terminal, a wireless communications device, a UE agent or a UE apparatus. This is not limited in the embodiments of the present application.

In NTN, since the base station is at high altitude and generally has high mobility, communications is often accompanied by large delay and high Doppler shift. When the value of the delay and Doppler shift exceeds the tolerance range of the base station, the communication quality can be degraded or even user access may fail.

To cope with the large delay and high Doppler shift in the NTN communications, a user may be provided with the position and speed information of the base station and user so that the user can calculate corresponding delay and Doppler shift and perform pre-compensation. Thus, it is not necessary to tolerate large delay and large frequency offset in the access process through enhancing the physical random access channel (PRACH). User access can be completed by following the PRACH format in the new radio (NR).

However, in different scenarios, the errors of the information obtained by a user are different, and the final calculated delay and Doppler shift may also have different error ranges. If the error ranges of the delay and Doppler shift are greater than the tolerance ranges of the corresponding base station, the access can fail even after pre-compensation.

Moreover, capabilities of users to perform timing-frequency pre-compensation are different, and the network types and service types supported by different users are different. Therefore, in a spatial three-dimensional network, a base station needs to perform an access restriction on users who do not satisfy specific conditions in different scenarios and time periods to improve network performance. However, the mechanism of a traditional terrestrial communications network cannot satisfy various requirements of different types of base stations in such networks.

Figure 2:
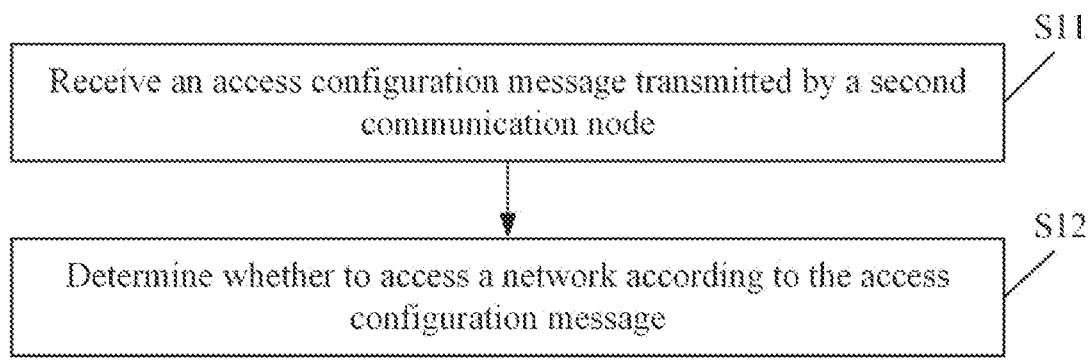
FIG. 2 is a flowchart of an access control method according to an embodiment of the present application.

In an embodiment, the present application provides an access control method. FIG. 2 is a flowchart of an access control method according to an embodiment of the present application. This method may be applied to determine whether a device is allowed to access. This method may be executed by an access control apparatus provided by the present application. This access control apparatus may be implemented by software and/or hardware. This method is applied by a first communication node.

As shown in FIG. 2, the access control method provided by this embodiment of the present application mainly includes steps S11 and S12.

In S11, an access configuration message transmitted by a second communication node is received.

In S12, whether to access a network is determined according to the access configuration message.

In this embodiment, the first communication node may be any one of the preceding user equipments. The second communication node may be any of the preceding base stations.

In this embodiment, the access configuration message is configured by the base station and sent to the user equipment. The configuration manner of the access configuration message is not limited in this embodiment.

In an example embodiment, the method also includes sending first communication node information to the second communication node. The first communication node information is configured by the second communication node to determine whether the first communication node is allowed to access a network.

A user may determine whether to access the network according to the access configuration information. Accordingly, the base station may determine whether to allow the user to access according to the user equipment information.

In the case where a user accesses a network for the first time, the user initiates a determination of whether to access the network. In the case where a user switches an access network, the base station initiates whether the user is allowed to access the network.

In an example embodiment, the method also includes: in the case where the number of failed attempts to access the network reaches a preset number of times, stopping accessing the network.

The preset number of times may be configured by the second communication node. When the second communication node restricts access according to invariable parameters such as a timing-frequency offset threshold, a relatively low preset number of times may be configured to save resources. When the second communication node restricts access according to variable parameters such as a load, a relatively high preset number of times may be configured to provide more access opportunities.

In an example embodiment, the access configuration message includes one or more of the following: an access condition, an access indication, and second communication node information.

In an example embodiment, the second communication node information may be the state information of a base station, and the state information of the base station includes the position, speed, and corresponding error range of the base station.

The first communication node may estimate the distance between the second communication node and the first communication node, the timing-frequency offset, and other parameters according to the second communication node information and the first communication node information, and assist the first communication node to determine whether the access condition is satisfied.

In an example embodiment, determining whether to access the network according to the access configuration message includes: determining whether to access the network according to an access indication sent by the second communication node.

In an example embodiment, the access indication includes one or more of the following: access being allowed; access being not allowed; and access being suspended.

In this embodiment, if the access indication is that access is allowed, a user is determined to be accessed the network.

If the access indication is that access is not allowed, a user is determined to be prohibited from accessing the network.

If the access indication is that access is suspended, a user is determined to be prohibited from accessing the network for a period of time. The waiting time may be configured by the second communication node.

In an example embodiment, determining whether to access the network according to the access configuration message includes: in the case where the access condition is not satisfied, stopping accessing the network.

In an example embodiment, in the case where the access condition is not satisfied, stopping accessing the network includes determining the node type of present node and, in the case where the node type of the present node is not the service type of the second communication node, stopping accessing the network.

In this embodiment, the node type may be classified according to services, for example, a narrowband (NB) terminal or an LTE terminal.

In this embodiment, the node type may be determined according to the level at which the node is located, for example, different power classes or supported antenna configurations (such as, whether circular polarization is supported). In this embodiment, the node type may be determined according to the node capability, for example, whether the pre-compensation capability is supported.

The node type may also be classified according to site types, such as a common terminal, a relay node, or an Integrated Access and Backhaul (IAB) node.

If the present node is a common terminal, the base station only allows an IAB terminal to access the network. In this case, the common terminal should be prohibited from accessing the network.

In an example embodiment, in the case where the access condition is not satisfied, stopping accessing the network includes, in the case where the signal power of uplink transmission is greater than an uplink signal power threshold, stopping access the network.

In an example embodiment, in the case where the access condition is not satisfied, stopping accessing the network includes: determining the distance between the second communication node and the first communication node according to the position information of the present node and, in the case where the distance is within a range where the access is not allowed, stopping accessing the network.

In an example embodiment, in the case where the access condition is not satisfied, stopping accessing the network includes, in the case where the position information of the present node is not within the service range of the second communication node, stopping accessing the network.

In this embodiment, the service range can be understood as the geographic position range that the second communication node can serve, that is, the geographic range.

A user obtains the position of the user through positioning and determines whether the user is within the geographic range served by the base station. If the position of the user is not within the geographic range served by the base station, the user stops accessing the network.

In an example embodiment, in the case where the access condition is not satisfied, stopping accessing the network includes, in the case where an operator required by the present node and an operator served by the second communication node are different, stopping accessing the network.

Base stations of different operators can be separate so that the base station of an operator can restrict the access of users of another operator.

In an example embodiment, in the case where the access condition is not satisfied, stopping accessing the network includes, in the case where the slice type of the present node is not the slice service type supported by the second communication node and the present node does not allow the slice type to change, stopping accessing the network.

In an example embodiment, in the case where the access condition is not satisfied, stopping accessing the network includes determining the timing offset range and/or frequency offset range of the present node and, in the case where the timing offset range exceeds the timing offset range that can be tolerated by the second communication node and/or the frequency offset range exceeds the frequency offset range that can be tolerated by the second communication node, stopping accessing the network.

In this embodiment, the base station sets tolerance ranges of timing offset (TO) and frequency offset (FO) to restrict the access of a user whose TO or FO is larger than the tolerance range.

The base station first informs the user of the state information of the base station and the tolerable TO and FO ranges. The user estimates the TO range and FO range that the user can reach according to the state information of the base station and user. If the TO range or the FO range exceeds the tolerance range of the base station, the user stops accessing the network.

In an example embodiment, in the case where the access condition is not satisfied, stopping accessing the network includes determining a node list that the present node can access and, in the case where the second communication node is not in the node list that the present node can access, stopping accessing the network.

In this embodiment, the content of the node list may be system information block (SIB) types, public land mobile network (PLMN) arrangement, frequency band allocation, cell identifiers (IDs), or the like. The first communication node may determine whether the second communication node can be accessed according to the second communication node information and the content of the node list.

In this embodiment, at the time of initial access, the node list can be acquired through the local storage information of the first communication node. The node list may be configured by a source base station when accessing during switching.

In an example embodiment, in the case where the access condition is not satisfied, stopping accessing the network includes: in the case where multiple accessed resource blocks are determined to be overloaded, stopping accessing overloaded resource blocks.

In an example embodiment, in the case where the access condition is not satisfied, stopping accessing the network includes: in the case where the operator served by a beam where the present node is located is determined to be inconsistent with the operator of the present node, stopping accessing the beam where the present node is located.

Figure 3:
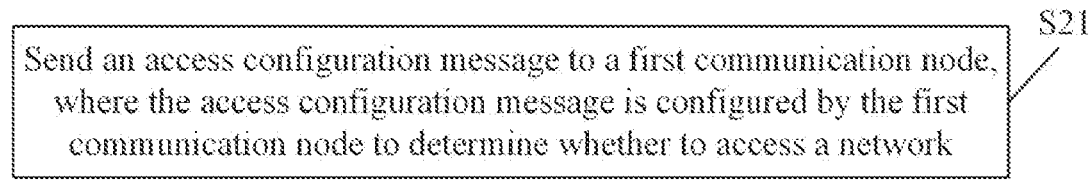
FIG. 3 is a flowchart of an access control method according to an embodiment of the present application.

In an embodiment, the present application provides an access control method. FIG. 3 is a flowchart of an access control method according to an embodiment of the present application. This method may be applied to determine whether a device is allowed to access. This method may be executed by an access control apparatus provided by the present application. This access control apparatus may be implemented by software and/or hardware. This method is applied by a second communication node.

As shown in FIG. 3, the access control method provided by this embodiment of the present application mainly includes step S21.

In S21, an access configuration message is sent to a first communication node. The access configuration message is configured by the first communication node to determine whether to access a network.

In an example embodiment, the method also includes acquiring first communication node information and determining, according to the first communication node information, whether to allow the first communication node to access the network.

In this embodiment, in the case where it is determined that the first communication node is allowed to access the network, an access admission instruction is generated and sent to the first communication node to allow the first communication node to access the network.

In the case where it is determined that the first communication node is not allowed to access the network, an access non-admission instruction is generated and sent to the first communication node to prohibit the first communication node from accessing the network.

How the second communication node determines whether the first communication node is allowed to access the network may refer to subsequent application embodiments. This is not described in this embodiment.

In an example embodiment, the first communication node information includes one or more of the following: the timing offset range of the first communication node; the frequency offset range of the first communication node; the a power of an uplink signal of the first communication node; the type of the first communication node; the service operator corresponding to the first communication node; the service range required by the first communication node; the slice service type supported by the first communication node; the priority of the first communication node and the load corresponding to the priority; and the position information of the first communication node.

In an example embodiment, the access configuration message includes one or more of the following: an access condition, an access indication, and second communication node information.

In an example embodiment, sending an access condition to the first communication node includes at least one of the following: broadcasting the access condition to the first communication node through a broadcast signaling; or pre-storing the access condition in a subscriber identity module (SIM) card of the first communication node or a universal subscriber identity module (USIM) card of the first communication node.

In an example embodiment, sending the second communication node information to the first communication node includes one or more of the following: broadcasting the second communication node information to the first communication node through a broadcast signaling; implicitly transmitting the second communication node information through an SIB type; and implicitly transmitting the second communication node information through different frequency bands, PLMN arrangement, and cell IDs.

In an example embodiment, the access condition includes one or more of the following: the timing offset range that can be tolerated by the second communication node; the frequency offset range that can be tolerated by the second communication node; the uplink signal power threshold configured by the second communication node; the node type to which the second communication node allows access; the operator served by the second communication node; the service range of the second communication node; the slice service type supported by the second communication node; and the priority of the first communication node and the load corresponding to the priority.

In an example embodiment, determining, according to the first communication node information, whether to allow the first communication node to access the network includes determining the priority of the first communication node and, in the case where the present node is overloaded, not allowing the first communication node of low priority to access the network.

In this embodiment, in the case where the present node is overloaded, the first communication node of low priority is not allowed to access the network. An access non-admission instruction is generated and sent to the first communication node of low priority to prohibit the first communication node of the low priority from accessing the network.

The present application provides an access restriction initiation and information transmission method.

The access restriction may be initiated at both the network side and the user side. The network side in the present application may be understood as the preceding base station or second communication node. The user side in this embodiment may be understood as the user equipment, the user terminal, or the first communication node.

In an application example, the base station initiates an access restriction to a user according to certain conditions.

The first type: the base station obtains the type and state information of the user and determines whether the user satisfies an access condition. If the access condition is not satisfied, the base station sends an access non-admission instruction to the user to restrict the access of the user. The user does not need to know the related information of the access restriction, but the type and state information of the user need to be known by the base station first. This condition can be satisfied at the time of switching. In this case, the information of the user can be transmitted from a source base station to a target base station through a core network. The base station only needs to transmit an access indication to a target user to indicate whether the network is allowed to be accessed.

The second type: the base station does not know the type and state information of the user, but can transmit the access condition to the user so that the user can determine whether the user satisfies the access condition. If not satisfied, the user does not initiate access to the base station.

For the second type, the following information transmission modes may be considered.

Mode 1: the access condition of the base station may be broadcast to a user through a signaling in the following suboptions.

(1) A bit field is defined in a broadcast signaling such as an MIB or SIB to transmit the access condition of the base station such as the timing offset and frequency offset ranges that the base station can tolerate. The length of the bit field is determined by the access condition. For example, if the access condition is that the timing-frequency offset is less than a certain range, the required number of bits is determined by the maximum range and the quantization accuracy.

(2) A bit field is defined in a broadcast signaling such as an MIB or SIB to transmit the type of the base station. The access condition corresponding to each type of base station is stored locally in the user in advance. The length of the bit field is $X=\text{ceil}(\log_2(\text{NumOfBSType}))$. NumOfBSType denotes the number of types of base stations.

(3) The type of a base station is implicitly transmitted through the SIB type. Each base station corresponds to an SIB. The user determines the type of the base station according to the decoded SIB type. The access condition corresponding to each type of base station is pre-stored locally in the user.

(4) The type of the base station is implicitly transmitted through using information such as different frequency bands, PLMN arrangement, and cell IDs. The user determines the type of the base station according to the corresponding information. The access condition corresponding to each type of base station is pre-stored locally in the user.

Mode 2: the access condition of the base station is pre-stored in the SIM card or USIM card of the user. After obtaining the information of the base station, the user may obtain the access condition of the base station through searching for pre-stored information and does not need to consume additional signaling for transmitting the access condition.

If the access restriction is initiated only in part of scenarios or time periods, it is also necessary to use additional 1-bit enable information in the MIB or SIB to identify the validity of the access restriction condition.

In an application example, a user actively initiates an access restriction according to certain conditions.

The first type: the user attempts to access a base station and stops accessing the base station after failing to access the base station a certain number of times. In this case, no additional signaling interaction is required between the user and the base station.

The second type: the user stores accessible types of base stations in the SIM or USIM in advance. If the type of the base station does not meet requirements, the user does not initiate the access. Even if the base station is of a type that the user can access, before initiating the access, the user needs to determine whether the access condition of the base station is satisfied.

The access restriction can be triggered by a variety of factors. When trigger scenarios are different, the initiation flow of the access restriction and the content of the message to be transmitted are different. The present application sequentially describes different access initiation flows and the content of the message to be transmitted in trigger scenarios.

In an application embodiment, the base station sets tolerance ranges of timing offset (TO) and frequency offset (FO) to restrict the access of a user whose TO or FO is larger than the tolerance range.

In NTN, communication links tend to be affected by large delay and high Doppler shift because over-the-air communication nodes are generally far from terrestrial users and have high mobility. To process the large delay and high Doppler shift, a user is generally provided with the position and speed information of the base station and user so that the user can calculate corresponding TO and FO and perform pre-compensation. However, since the positioning information may have certain errors, the calculated TO and FO can also have corresponding errors. If the final residual TO or FO is too large and exceeds the range that the base station can tolerate, the access of these users should be restricted.

In this case, the access restriction may be initiated by the base station.

At the time of initial access, the base station first transmits an access configuration message to the user, and the access configuration message includes the state information of the base station (position, speed, and corresponding error ranges) and tolerable TO and FO thresholds. The user estimates the TO and FO calculation accuracy that the user can reach according to the base station and the state information of the user and obtains the residual TO and FO ranges after pre-compensation. If the maximum value of TO is greater than the TO threshold or the maximum value of FO is greater than the FO threshold, it is considered that access is restricted, and the user stops accessing the network. Otherwise, it is considered that the access is not restricted because the TO and FO are too large.

At the time of switching, the target base station obtains the user information from a source base station through a core network and estimates the residual TO and FO ranges after pre-compensation. If the maximum value of TO is greater than the TO threshold or the maximum value of FO is greater than the FO threshold, access is determined to be restricted, and an indication that access being not allowed is sent to the user. Otherwise, the access is determined to be not restricted because the TO and FO are too large.

In an application embodiment, the base station allows only a specific type of users to access.

Different users have different hardware configurations with different communication capabilities and functions so that multiple user equipment (UE) categories are divided. The base station may serve only the target type of users and restricts the access of other types of users.

For example, the base station allows only users with a high enough power class to access and restricts the access of users with a low power class to improve network performance. In this case, the UE categories are divided according to the power classes of users. Users with different power classes can be divided into different UE categories. The network can restrict the access of users belonging to a specific UE category.

For example, the base station allows only the access of an integrated access and backhaul (IAB) terminal, mainly serving wireless backhaul work, and thus restricts the access of ordinary terrestrial users. In this case, the UE categories are divided according to terminal types of users including an ordinary handheld terminal and an IAB terminal. Users with different terminal types can be divided into different UE categories. The network can restrict the access of users belonging to a specific UE category.

For example, the base station serves only users of the narrowband internet of things (NB-IoT) service type and restricts access of users of LTE and NR service types to improve network performance. In this case, the UE categories are divided according to the service types of users. Users with different service types can be divided into different UE categories. The network can restrict the access of users belonging to a specific UE category.

In these cases, the access restriction may be initiated by the base station.

At the time of initial access, the base station first transmits a list to a user. The list contains the UE categories supported by the base station. If the UE category of the user is not in the list, the access is determined to be restricted, and the user stops accessing the network. Otherwise, the access is determined to be not restricted because of the UE category.

At the time of switching, a target base station obtains the user information from a source base station through a core network and knows the UE category of the user. If the UE category of the user is not a type that can be served by the base station and the types that can be served by the base station do not change in a short period of time, it is considered that the access is restricted, and an indication that access is not allowed is sent to the user. If the UE category of the user cannot be served by the base station temporarily, but it is expected that the UE category can be served by the base station after a period of time, the access is temporarily determined to be restricted, and an indication of suspending the access is sent to the user and the waiting time is configured. Otherwise, the access is determined to be not restricted because of the UE category.

In an application embodiment, the base station sets an uplink signal power threshold to restrict the access of a user whose uplink signal power is greater than the threshold.

During multi-user access, a user with high signal power can cause serious interference to a user with low signal power, thereby reducing the access success rate of the user with low signal power. Therefore, the base station needs to restrict the access of users whose uplink signal power is excessive high to reduce interference to other users.

In this case, the access restriction may be initiated by the base station.

At the time of initial access, the base station may inform a user whether access is restricted through the following modes.

Mode 1: if the sending power of a user is known, the uplink signal power received by the base station is determined by the distance between the base station and the user. Therefore, the base station first transmits an access configuration message including the position information of the base station and the distance threshold for restricting access to the user. The user estimates the distance to the base station according to the position information of the base station and user. If the estimated distance is less than the distance threshold, the access is determined to be restricted, and the user stops accessing the network. Otherwise, the access is determined to be not restricted because the uplink signal power is excessive high.

Mode 2: the base station directly measures the reception power of an uplink signal. If the reception power is greater than the power threshold set by the base station and the power threshold does not change in a short period of time, the access is determined to be restricted, and an indication that access being not allowed is sent to the user. If the reception power is greater than the power threshold set by the base station, but it is expected that the power threshold can increase after a period of time, the access is determined to be temporarily restricted, and an indication of suspending the access is sent to the user and the waiting time is configured. Otherwise, the access is determined to be not restricted because the uplink signal power is excessive high.

Mode 3: the base station first transmits an access configuration message including the position information of the base station and the reception power threshold for restricting access to the user. The user estimates the distance to the base station according to the position information of the base station and user, thereby calculating path loss. If the sending power of the user minus the path loss is still greater than the reception power threshold of the base station, the access is determined to be restricted, and the user stops accessing the network. Otherwise, the access is determined to be not restricted because the uplink signal power is excessive high.

At the time of switching, the base station may inform a user whether access is restricted through the following modes.

Mode 1: a target base station obtains the user position information from a source base station through a core network and calculates the distance between the user and the target base station. If the calculated distance is less than the distance threshold, the access is determined to be restricted, and an indication that access being not allowed is sent to the user. Otherwise, the access is determined to be not restricted because the uplink signal power is excessive high.

Mode 2: a target base station directly measures the reception power of an uplink signal. If the reception power is greater than the power threshold set by the base station and the power threshold does not change in a short period of time, it the access is determined to be restricted, and an indication that access being not allowed is sent to the user. If the reception power is greater than the power threshold set by the base station, but it is expected that the power threshold can increase after a period of time, the access is determined to be temporarily restricted, and an indication of suspending the access is sent to the user and the waiting time is configured. Otherwise, the access is determined to be not restricted because the uplink signal power is excessive high.

Mode 3: a target base station obtains the position information and sending power of the user from a source base station through a core network. The distance between the user and the target base station is calculated to obtain path loss. If the sending power of the user minus the path loss is still greater than the reception power threshold of the base station, the access is determined to be restricted, and an indication that access being not allowed is sent to the user. Otherwise, the access is determined to be not restricted because the uplink signal power is excessive high.

In an application embodiment, the base station restricts the access of users of a specific operator.

Base stations of different operators can be separate so that the base station of an operator can restrict the access of users of another operator. Generally, operators are differentiated through PLMN identifiers.

In this case, the access restriction may be initiated by a base station or a user.

Mode 1: the access restriction is initiated by the base station. At the time of initial access and switching, the base station first transmits the information of the base station including the PLMN list supported by the base station to a user. If the PLMN that the user can access is not in the supported PLMN list, the access is determined to be restricted, and the user stops accessing the network. Otherwise, the access is determined to be not restricted because the PLMN does not be supported.

Mode 2: the access restriction is initiated by the user. At the time of initial access and switching, the user determines the PLMN supported by the base station through pre-stored information. If the PLMN that the user can access is not in the supported PLMN list, the access is determined to be restricted, and the user stops accessing the network. Otherwise, the access is determined to be not restricted because the PLMN does not be supported.

In an application embodiment, the base station restricts the access of users of a specific area.

A satellite base station generally has very wide coverage, which can be cross-border. However, because of policies and other reasons, the base station may serve only users of a specific region and restrict the access of users of other areas.

In this case, the access restriction may be initiated by the base station.

At the time of initial access, the base station may inform a user whether access is restricted through the following modes.

Mode 1: a base station first transmits an access configuration message including an area range served by the base station to a user. The area range can be determined by a series of coordinate points. The user obtains the position information of the user through positioning. If the position of the user is outside the served area range, the access is determined to be restricted, and the user stops accessing the network. Otherwise, the access is determined to be not restricted because the user is not in the served area.

Mode 2: if the user cannot position the position of the user or directly accesses the network regardless of the area restriction, the base station allows the user to enter first. After the access is completed, the base station measures the position of the user through satellite positioning or requests the user to report the position information. If the position of the user is not within the area range served by the base station, the access is determined to be restricted, and the base station disconnects and sends an indication that access is not allowed to the user. Otherwise, the access is determined to be not restricted because the user is not in the served area.

At the time of switching, a target base station obtains user position information from a source base station through a core network. If the position of the user is not within the area range served by the base station, the access is determined to be restricted, and an indication that access is not allowed is sent to the user. Otherwise, the access is determined to be not restricted because the user is not in the served area.

In an application embodiment, the base station restricts the access of users of a specific network slice service type.

The core network of the NR supports multiple network slices, but the slice service type supported by the base station may be different. If the network slice type subscribed by a user from an operator is different from the slice type supported by the base station and the change of the slice type is not accepted, the access of the user should be restricted.

In this case, the access restriction may be initiated by the base station.

At the time of initial access, the base station first transmits a list to a user. The list contains the network slice service types supported by the base station. If the network slice type of the user is not in the list and the user does not tolerate the change of slice type, it is considered that the access is restricted, and the user stops accessing the network. Otherwise, it is considered that the access is not restricted because of the network slice type.

At the time of switching, a target base station obtains the slice type of the user and whether the user allows the slice type to change from a source base station through a core network. If the slice type of the user is not the type supported by the base station, and the user does not allow the slice type to change, the access is determined to be restricted, and the base station sends an indication that access is not allowed to the user. Otherwise, the access is determined to be not restricted because of the network slice type.

In an application embodiment, a user accesses only base stations of a target type.

In some private networks, to improve efficiency, a user only accesses a pre-set base station type. For example, for an internet of things network deployed outdoors in suburban areas, users may be designated to access only air-to-ground (ATG) base stations designed specifically for the network to avoid inefficient access to other general-purpose base stations.

In this case, the access restriction may be initiated by a user.

At the time of initial access and switching, after receiving the information of the base station, the user determines whether the base station is of a type that can be accessed by the user according to the base station list pre-stored in the SIM or USIM card. If the base station is not in the pre-stored list of base stations which are allowed to access, the access is determined to be restricted, and the user stops accessing the network. Otherwise, the access is determined to be not restricted because of the type of the base station.

In an application embodiment, a base station randomly restricts the access of some users according to the load.

When the base station is overloaded, the received access requests exceed capacity. To avoid performance degradation due to congestion, the base station may restrict the access of some users, even if other access restriction conditions are satisfied.

In this case, the access restriction may be initiated by the base station.

At the time of initial access and switching, the base station divides users into multiple access categories with different priorities and informs users whether access is restricted through the following modes.

Mode 1: the base station directly transmits an access indication to a user. The base station sets a load threshold for each access category according to the priority and generally sets a higher threshold for a user with a higher priority. If the load of the base station is greater than the load threshold of a certain access category, the access indication of the access category is set to not allow access or to suspend access. At the time of access, the base station sends to the user a list containing the access indication of each access category and configures the corresponding waiting time for a suspended access indication. If the access category to which the user belongs is indicated in the list that access being not allowed, the access is determined to be restricted, and the user stops accessing the network. If the access category to which the user belongs is indicated in the list as suspended access, it is considered that the access is temporarily restricted, and the user stops accessing the network within the waiting time. Otherwise, it is considered that the access is not restricted because of the access category.

Mode 2: the base station directly transmits a random number threshold to the user to perform soft restriction. The base station sets a random number threshold for each access category according to the load and priority of the base station and generally sets a higher threshold for an access category with lower load and higher priority. At the time of access, the base station sends to the user a list containing the random number threshold of each access category. The user generates a random number locally. If the random number is greater than the threshold corresponding to the access category to which the user belongs in the list, it is considered that the current access is restricted, and the user stops accessing the network within a random period of time. Otherwise, the access is determined to be not restricted because of the access category.

The base station may divide radio resources (frequency, time, beam, and the like) to serve different users. Therefore, it may be considered to further implement access restriction according to radio resources, that is, a base station sets different access restriction conditions for different resource blocks so that the network configuration is more flexible and efficient.

In an application embodiment, the base station restricts a user to access overloaded resource blocks.

Each resource block (for example, a frequency band) may be regarded as a channel. When the channel is overloaded, new user access requests should be restricted to reduce load.

In this case, the access restriction may be initiated by the base station.

Mode 1: when a user attempts to access through a channel corresponding to a resource block, the base station estimates the load of the channel, for example, the number of accessed users. If the load is greater than a threshold value set by the base station, the access is determined to be restricted, and the base station sends a suspended indication to a user attempting to access the network through the channel and configures waiting time. Otherwise, the access is determined to be not restricted because of overload of resource blocks.

Mode 2: the base station transmits to a user the load of the channel corresponding to each resource block, for example, the quality of service (QOS) that the base station can provide through the channel. If the QoS available to the user is lower than a threshold value because of channel overload, the access is determined to be temporarily restricted, and the user waits for a period of time before attempting to access through the channel or attempting to access through selecting a channel corresponding to another resource block. Otherwise, the access is determined to be not restricted because of overload of resource blocks.

In an application embodiment, different resource blocks of a base station belong to different owners, restricting access of users of different owners.

A satellite base station may generate dozens of beams. Each beam may have a diameter of tens to hundreds of kilometers. Thus, a satellite base station can cover large area, so the situation that different beams are located in different countries occurs. If operators in different countries are different, the beam corresponding to each country needs to restrict the access of users in other countries, so the beam-based access restriction is necessary.

In this case, the access restriction may be initiated by a base station or a user.

Mode 1: the access restriction is initiated by the base station. At the time of initial access and switching, the base station first transmits the information of the beam in which the user is located to the user. The information includes the PLMN list supported by the beam. If the PLMN that the user can access is not in the supported PLMN list, the access is determined to be restricted, and the user stops accessing the network from the beam. Otherwise, the access is determined to be not restricted because the PLMN does not be supported.

Mode 2: the access restriction is initiated by the user. At the time of initial access and switching, the user determines the PLMN supported by the beam in which the user is located through pre-stored information. If the PLMN that the user can access is not in the supported PLMN list, the access is determined to be restricted, and the user stops accessing the network from the beam. Otherwise, the access is determined to be not restricted because the PLMN does not be supported.

Figure 4:
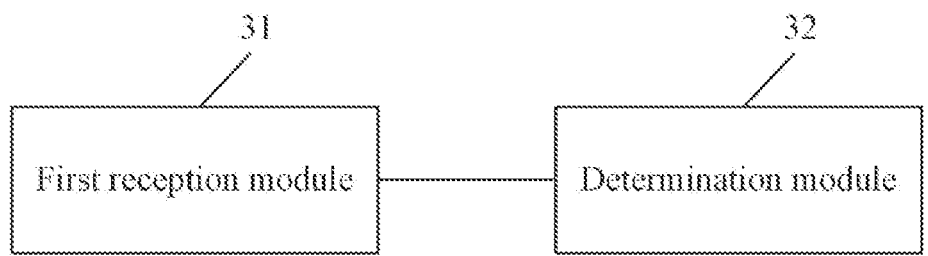
FIG. 4 is a diagram illustrating the structure of an access control apparatus according to an embodiment of the present application.

In an embodiment, the present application provides an access control apparatus. FIG. 4 is a diagram illustrating the structure of an access control apparatus according to an embodiment of the present application. This apparatus can be applied to determine whether a device is allowed to access. This access control apparatus may be implemented by software and/or hardware. The apparatus is configured in a first communication node.

As shown in FIG. 4, the access control apparatus provided by this embodiment of the present application mainly includes a first reception module 31 and a determination module 32. The first reception module 31 is configured to receive an access configuration message transmitted by a second communication node. The determination module 32 is configured to determine whether to access the network according to the access configuration message.

In an example embodiment, the apparatus also includes a second sending module.

The second sending module is configured to send first communication node information to the second communication node. The first communication node information is configured by the second communication node to determine whether the first communication node is allowed to access a network.

In an example embodiment, the determination module 32 is configured to, in the case where the number of failed attempts to access the network reaches a preset number of times, stop accessing the network.

In an example embodiment, the access configuration message includes one or more of the following: an access condition; an access indication; and second communication node information.

In an example embodiment, the determination module 32 is configured to determine whether to access the network according to an access indication sent by the second communication node.

In an example embodiment, the access indication includes one or more of the following: access being allowed; access being not allowed; and access being suspended.

In an example embodiment, the determination module 32 is configured to, in the case where the access condition is not satisfied, stop accessing the network.

In an example embodiment, the determination module 32 is configured to determine the node type of present node and, in the case where the node type of the present node is not the service type of the second communication node, stop accessing the network.

In an example embodiment, the determination module 32 is configured to stop accessing the network in the case where the signal power of uplink transmission is greater than an uplink signal power threshold.

In an example embodiment, the determination module 32 is configured to determine the distance between the second communication node and the first communication node according to the position information of the present node and, in the case where the distance is within a range where the access is not allowed, stop accessing the network.

In an example embodiment, the determination module 32 is configured to, in the case where the position information of the present node is not within the service range of the second communication node, stop accessing the network.

In an example embodiment, the determination module 32 is configured to, in the case where an operator required by the present node and an operator served by the second communication node are different, stop accessing the network.

In an example embodiment, the determination module 32 is configured to, in the case where the slice type of the present node is not the slice service type supported by the second communication node and the present node does not allow the slice type to change, stop accessing the network.

In an example embodiment, the determination module 32 is configured to determine the timing offset range and/or frequency offset range of the present node and, in the case where the timing offset range exceeds the timing offset range that can be tolerated by the second communication node and/or the frequency offset range exceeds the frequency offset range that can be tolerated by the second communication node, stop accessing the network.

In an example embodiment, the determination module 32 is configured to determine a node list that the present node can access and, in the case where the second communication node is not in the node list that the present node can access, stop accessing the network.

In an example embodiment, the determination module 32 is configured to, in the case where it is determined that multiple accessed resource blocks are overloaded, stop accessing overloaded resource blocks.

In an example embodiment, the determination module 32 is configured to, in the case where it is determined that the operator served by a beam where the present node is located is inconsistent with the operator of the present node, stop accessing the beam where the present node is located.

The access control apparatus provided by this embodiment can execute the access control method provided by any embodiment of the present application and has function modules and effects corresponding to this method. Technology details that are not described in detail in this embodiment can refer to the access control method provided by any embodiment of the present application.

Units and modules involved in the embodiment of the preceding access control apparatus are just divided according to functional logic, and the division is not limited to this, as long as the corresponding functions can be implemented. In addition, the names of the each functional unit are just intended for distinguishing and are not to limit the protection scope of the present application.

Figure 5:
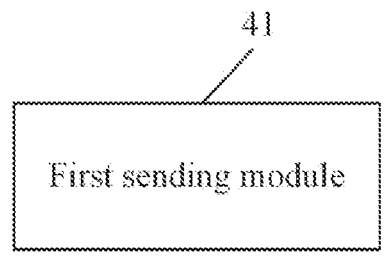
FIG. 5 is a flowchart of an access control apparatus according to an embodiment of the present application.

In an embodiment, the present application provides an access control apparatus. FIG. 5 is a flowchart of an access control apparatus according to an embodiment of the present application. This apparatus can be applied to determine whether a device is allowed to access. This access control apparatus may be implemented by software and/or hardware. The apparatus is configured in a second communication node.

As shown in FIG. 5, the access control apparatus provided by this embodiment of the present application mainly includes a first sending module 41. The first sending module 41 is configured to send an access configuration message to a first communication node. The access configuration message is configured by the first communication node to determine whether to access a network.

In an example embodiment, the apparatus also includes an acquisition module and a second determination module.

The acquisition module is configured to acquire first communication node information. The second determination module is configured to determine whether to allow the first communication node to access the network according to the first communication node information.

In an example embodiment, the first communication node information includes one or more of the following: the timing offset range of the first communication node; the frequency offset range of the first communication node; the a power of an uplink signal of the first communication node; the type of the first communication node; the service operator corresponding to the first communication node; the service range required by the first communication node; the slice service type supported by the first communication node; the priority of the first communication node and the load corresponding to the priority; and the location information of the first communication node.

In an example embodiment, the access configuration message includes one or more of the following: an access condition; an access indication; and second communication node information.

In an example embodiment, the first sending module 41 is configured to execute one of the following operations: broadcasting the access condition to the first communication node through a broadcast signaling; or pre-storing the access condition in the SIM card of the first communication node or the USIM card of the first communication node.

In an example embodiment, the first sending module 41 is configured to execute one of the following operations: broadcasting the second communication node information to the first communication node through a broadcast signaling; implicitly transmitting the second communication node information through an SIB type; or implicitly transmitting the second communication node information through different frequency bands, PLMN arrangement, and cell IDs.

In an example embodiment, the access condition includes one or more of the following: the timing offset range that can be tolerated by the second communication node; the frequency offset range that can be tolerated by the second communication node; the uplink signal power threshold configured by the second communication node; the node type to which the second communication node allows access; the operator served by the second communication node; the service range of the second communication node; the slice service type supported by the second communication node; and the priority of the first communication node and the load corresponding to the priority.

In an example embodiment, the second determination module is configured to determine the priority of the first communication node and, in the case where the present node is overloaded, not allow the first communication node of low priority to access the network.

The access control apparatus provided by this embodiment can execute the access control method provided by any embodiment of the present application and has function modules and effects corresponding to this method. Technology details that are not described in detail in this embodiment can refer to the access control method provided by any embodiment of the present application.

Units and modules involved in the embodiment of the preceding access control apparatus are just divided according to functional logic, and the division is not limited to this, as long as the corresponding functions can be implemented. In addition, the names of the each functional unit are just intended for distinguishing, and are not to limit the protection scope of the present application.

Figure 6:
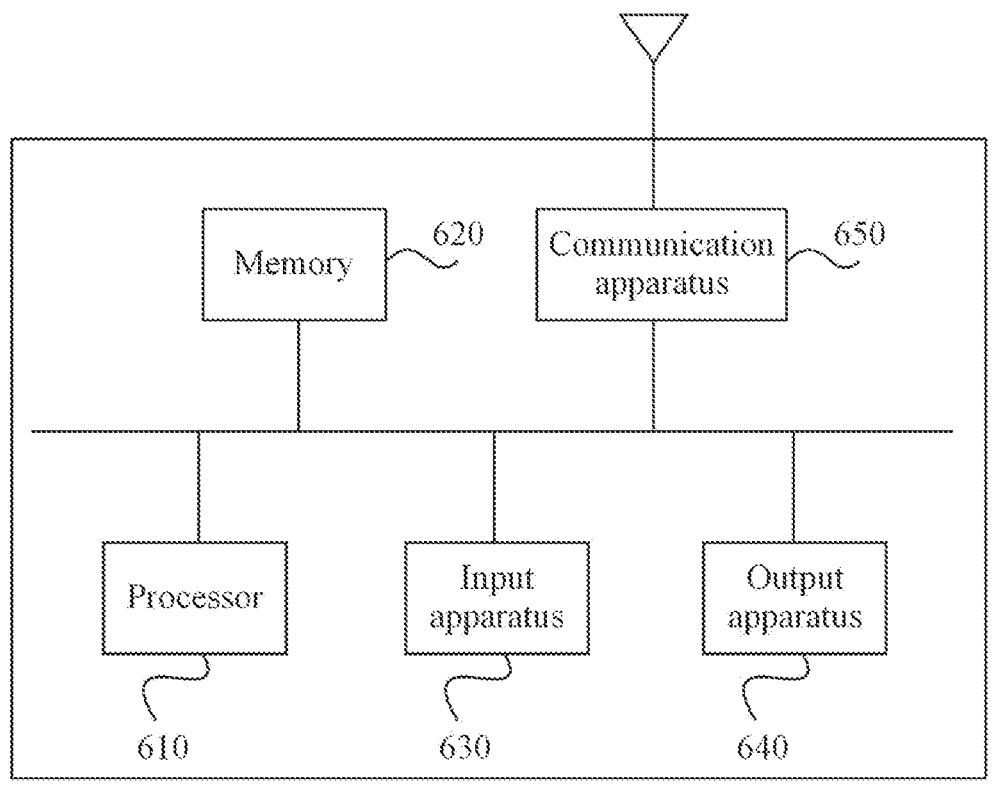
FIG. 6 is a diagram illustrating the structure of a device according to an embodiment of the present application.

An embodiment of the present application provides a device. FIG. 6 is a diagram illustrating the structure of a device according to an embodiment of the present application. As shown in FIG. 6, the device includes a processor 610, a memory 620, an input apparatus 630, an output apparatus 640, and a communication apparatus 650. The number of processors 610 in the device may be one or more, and one processor 610 is used as an example in FIG. 6. The processor 610, the memory 620, the input apparatus 630, and the output apparatus 640 in the device may be connected through a bus or in other modes. In FIG. 6, the connection through the bus is used as an example.

As a computer-readable storage medium, the memory 620 may be configured to store software programs, computer-executable programs, and modules, such as program instructions/modules (for example, the first reception module 31 and the determination module 32 in the access control apparatus) corresponding to the access control method in this embodiment of the present application, and program instructions/modules (for example, the first sending module 41 in the access control apparatus) corresponding to the access control method in this embodiment of the present application. The processor 610 runs the software programs, instructions, and modules stored in the memory 620 to execute function applications and data processing of the device, that is, to implement the method provided by any embodiment of the present application.

The memory 620 may mainly include a program storage region and a data storage region. The program storage region may store an operating system and an application program required by at least one function. The data storage region may store data created depending on use of a device. Additionally, the memory 620 may include a high-speed random-access memory and may also include a nonvolatile memory such as at least one disk memory, a flash memory, or another nonvolatile solid-state memory. In some examples, the memory 620 may include memories which are remotely disposed relative to the processor 610, and these remote memories may be connected to the device via a network. Examples of the preceding network include, but are not limited to, the Internet, an intranet, a local area network, a mobile communications network, and a combination thereof.

The input apparatus 630 may be configured to receive inputted digital or character information and generate key signal input related to user settings and function control of the device. The output apparatus 640 may include display devices such as a display screen.

The communication apparatus 650 may include a receiver and a transmitter. The communication apparatus 650 is configured to perform information transceiving communication under the control of the processor 610.

In the case where the preceding device is a first communication node, the processor 610 executes various functional applications and data processing through running programs stored in a system memory 620, for example, to implement the access control method provided by this embodiment of the present application. The method includes: receiving an access configuration message transmitted by a second communication node; and determining whether to access a network according to the access configuration message.

The processor 610 may also implement the technical solution of the access control method provided by any embodiment of the present application. For the hardware structure and functions of the device, reference may be made to the content explanation of this embodiment.

In the case where the preceding device is a second communication node, the processor 610 executes various functional applications and data processing through running programs stored in the system memory 620, for example, to implement the access control method provided by this embodiment of the present application. The method includes: sending an access configuration message to a first communication node. The access configuration message is configured by the first communication node to determine whether to access a network.

The processor 610 may also implement the technical solution of the access control method provided by any embodiment of the present application. For the hardware structure and functions of the device, reference may be made to the content explanation of this embodiment.

An embodiment of the present application provides a storage medium containing computer-executable instructions, and the computer-executable instructions are used for executing an access control method when executed by a computer processor. The method is applied by a first communication node and includes: receiving an access configuration message transmitted by a second communication node; and determining whether to access a network according to the access configuration message.

In the storage medium containing computer-executable instructions provided by this embodiment of the present application, the computer-executable instructions implement not only the preceding method operations but also related operations in the access control method provided by any embodiment of the present application.

An embodiment of the present application provides a storage medium containing computer-executable instructions, and the computer-executable instructions are used for executing an access control method when executed by a computer processor. The method is applied by a second communication node and includes: sending an access configuration message to a first communication node. The access configuration message is configured by the first communication node to determine whether to access a network.

In the storage medium containing computer-executable instructions provided by this embodiment of the present application, the computer-executable instructions implement not only the operations of the preceding access control method but also related operations in the access control method provided by any embodiment of the present application.

From the preceding description of the embodiments, the present application may be implemented by relying on both software and necessary general-purpose hardware, and also by relying on hardware. The technical solutions of the present application may be essentially embodied in the form of a software product. The software product in a computer may be stored in a computer-readable storage medium such as a floppy disk, read-only memory (ROM), random-access memory (RAM), flash memory, hard disk or optical disc in the computer and includes some instructions for enabling a computer device (which may be a personal computer, a server or a network device) to execute the method of any embodiment of the present application.

The term user terminal encompasses any appropriate type of wireless user equipment, such as a mobile phone, a portable data processing apparatus, a portable web browser, or a vehicle-mounted mobile station.

In general, multiple embodiments of the present application may be implemented in hardware, dedicated circuits, software, logics, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in the memory. The memory may be of any type suitable for a local technical environment and may be implemented using any suitable data storage technology, such as, but not limited to, a read-only memory (ROM), a random access memory (RAM), and an optical memory apparatus and system (a digital video disk (DVD) or a compact disk (CD)). The computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor according to a multi-core processor architecture.

What is claimed is:

1. An access control method, applied to a first communication node, comprising:
   receiving an access configuration message transmitted by a second communication node; and
   determining whether to access a network according to the access configuration message;
   wherein the first communication node comprises a user equipment (UE) the second communication node comprises a base station, and the access configuration message is configured by the base station and sent to the UE;
   wherein at the time of initial access, the UE receives the access configuration message sent from the base station, the access configuration message comprises an area range served by the base station to the UE, the area range is determined by a series of coordinate points, and the UE obtains position information of the UE through positioning;
   the method further comprises:
   when a position of the UE is outside the served area range, determining that the access is restricted, and stopping, by the UE, accessing the network;
   when the position of the UE is within the served area range, determining that the access is not restricted; and
   when the position of the UE is not positioned by the UE or the UE directly accesses the network, the UE being allowed to enter first regardless of an area restriction, wherein after the access is completed, the base station measures the position of the UE through satellite positioning or requests the UE to report the position information, when the position of the UE is not within the served area range, the access is determined to be restricted, the base station disconnects and sends an indication that the access is not allowed to the UE; when the position of the UE is within the served area range, the access is determined to be not restricted.

2. The method according to claim 1, further comprising:
   sending first communication node information to the second communication node, wherein the first communication node information is configured by the second communication node to determine whether the first communication node is allowed to access the network.

3. The method according to claim 1, further comprising:
   in a case where a number of failed attempts to access the network reaches a preset number of times, stopping accessing the network.

4. The method according to claim 1, wherein the access configuration message comprises at least one of the following:
   an access condition;
   an access indication; or
   second communication node information.

5. The method according to claim 4, wherein determining whether to access the network according to the access configuration message comprises:
   determining, according to the access indication sent by the second communication node, whether to access the network.

6. The method according to claim 4, wherein the access indication comprises at least one of the following:
   access being allowed;
   access being not allowed; or
   access being suspended.

7. The method according to claim 4, wherein determining whether to access the network according to the access configuration message comprises:
   in a case where the access condition is not satisfied, stopping accessing the network.

8. The method according to claim 7, wherein in the case where the access condition is not satisfied, the stopping accessing the network comprises:
   determining a node type of the first communication node; and
   in a case where the node type of the first communication node is not a service type of the second communication node, stopping access the network.

9. The method according to claim 7, wherein in the case where the access condition is not satisfied, the stopping accessing the network comprises:
   in a case where signal power of uplink transmission is greater than an uplink signal power threshold, stopping access the network.

10. The method according to claim 7, wherein in the case where the access condition is not satisfied, stopping accessing the network comprises:
    determining a distance between the second communication node and the first communication node according to position information of the first communication node; and in a case where the distance is not within a range where the access being allowed, stopping accessing the network.

11. The method according to claim 7, wherein in the case where the access condition is not satisfied, the stopping accessing the network comprises:
in a case where position information of present node is not within a service range of the second communication node, stopping accessing the network.

12. The method according to claim 7, wherein in the case where the access condition is not satisfied, the stopping accessing the network comprises:
determining at least one of a timing offset range of the first communication node or a frequency offset range of the first communication node; and
stopping accessing the network in at least one of following cases: the timing offset range exceeds a timing offset range that can be tolerated by the second communication node or the frequency offset range exceeds a frequency offset range that can be tolerated by the second communication node.

13. A non-transitory storage medium storing a computer program which, when executed by a processor, implements the access control method according to claim 1.

14. An access control method, applied to a second communication node, comprising:
sending an access configuration message to a first communication node, wherein the access configuration message is configured by the first communication node to determine whether to access a network;
wherein the first communication node comprises a user equipment (UE), the second communication node comprises a base station, and the access configuration message is configured by the base station and sent to the UE;
wherein at the time of initial access, the base station transmits the access configuration message sent to the UE, the access configuration message comprises an area range served by the base station to the UE, the area range is determined by a series of coordinate points, and the UE obtains position information of the UE through positioning;
the method further comprises:
when a position of the UE is outside the served area range, determining that the access is restricted, and the UE is stopped to access the network;
when the position of the UE is within the served area range, determining that the access is not restricted; and
when the position of the UE is not positioned by the UE or the UE directly accesses the network, allowing, by the base station, the UE to enter first regardless of an area restriction, wherein after the access is completed, the base station measures the position of the UE through satellite positioning or requests the UE to report the position information, when the position of the UE is not within the served area range, the access is determined to be restricted, the base station disconnects and sends an indication that the access is not allowed to the UE; when the position of the UE is within the served area range, the access is determined to be not restricted.

15. The method according to claim 14, further comprising:
acquiring first communication node information; and
determining, according to the first communication node information, whether to allow the first communication node to access the network.

16. The method according to claim 15, wherein the first communication node information comprises at least one of the following:
a timing offset range of the first communication node;
a frequency offset range of the first communication node;
a power of an uplink signal of the first communication node;
a type of the first communication node;
a service operator corresponding to the first communication node;
a service range required by the first communication node;
a slice service type supported by the first communication node;
a priority of the first communication node and a load corresponding to the priority; or
position information of the first communication node.

17. The method according to claim 14, wherein the access configuration message comprises at least one of the following:
an access condition;
an access indication; or
second communication node information.

18. The method according to claim 17, wherein sending the second communication node information to the first communication node comprises at least one of the following:
broadcasting the second communication node information to the first communication node through a broadcast signaling;
implicitly transmitting the second communication node information through a system information block (SIB) type; or
implicitly transmitting the second communication node information through different frequency bands, public land mobile network (PLMN) arrangement, and cell identifiers (IDs).

19. The method according to claim 17, wherein the access condition comprises at least one of the following:
a timing offset range that can be tolerated by the second communication node;
a frequency offset range that can be tolerated by the second communication node;
an uplink signal power threshold configured by the second communication node;
a node type to which the second communication node allows access;
an operator served by the second communication node;
a service range of the second communication node;
a slice service type supported by the second communication node; or
a priority of the first communication node and a load corresponding to the priority.

20. An access control apparatus, configured in a first communication node, comprising:
at least one processor; and
a memory configured to store at least one program,
wherein executed by the at least one processor, the at least one program causes the at least one processor to implement an access control method, wherein the access control method comprises:
receiving an access configuration message transmitted by a second communication node; and
determining whether to access a network according to the access configuration message;
wherein the first communication node comprises a user equipment (UE) the second communication node comprises a base station, and the access configuration message is configured by the base station and sent to the UE;

wherein at the time of initial access, the UE receives the access configuration message sent from the base station, the access configuration message comprises an area range served by the base station to the UE, the area range is determined by a series of coordinate points, and the UE obtains position information of the UE through positioning;

the method further comprises:

when a position of the UE is outside the served area range, determining that the access is restricted, and stopping, by the UE, accessing the network;

when the position of the UE is within the served area range, determining that the access is not restricted; and when the position of the UE is not positioned by the UE or the UE directly accesses the network, the UE being allowed to enter first regardless of an area restriction, wherein after the access is completed, the base station measures the position of the UE through satellite positioning or requests the UE to report the position information, when the position of the UE is not within the served area range, the access is determined to be restricted, the base station disconnects and sends an indication that the access is not allowed to the UE; when the position of the UE is within the served area range, the access is determined to be not restricted.

* * * * *